UNITED STATES PATENT OFFICE.

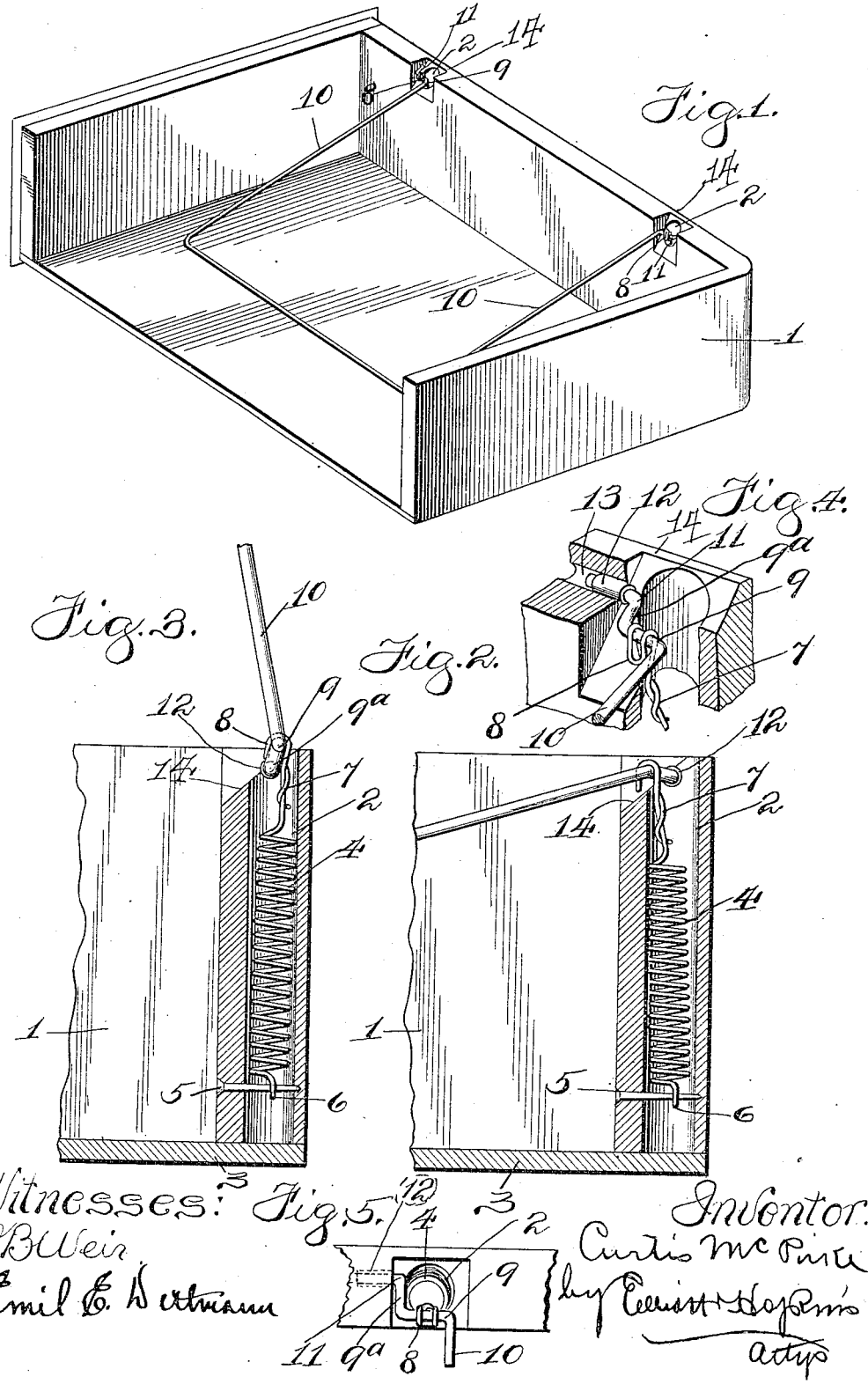

CURTIS McPIKE, OF WABASH, INDIANA.

LETTER-FILE.

No. 825,067. Specification of Letters Patent. Patented July 3, 1906.

Application filed November 17, 1904. Serial No. 233,073.

*To all whom it may concern:*

Be it known that I, CURTIS McPIKE, a citizen of the United States, residing at Wabash, in the county of Wabash and State of Indiana, have invented certain new and useful Improvements in Letter-Files, of which the following is a full, clear, and exact specification.

My invention relates to that type of letter-files usually comprising a drawer or box with a spring-pressed bail or clamp hinged therein for holding the documents in place; and the invention has for its primary object to provide an improved, efficient, simple, and inexpensive construction of letter-file of this character.

With these ends in view the invention consists in certain features of novelty hereinafter described with reference to the accompanying drawings, and more particularly pointed out in the claims.

In the said drawings, Figure 1 is a perspective view of my improved letter-file. Fig. 2 is a vertical section taken in a plane passing through the axis of one of the springs, showing the bail lowered. Fig. 3 is a similar view showing the bail elevated. Fig. 4 is an enlarged detail perspective view of a part thereof hereinafter described, and Fig. 5 is a detail plan view.

1 is a box or drawer of any suitable construction, in the side of which are formed two vertical sockets or bores 2, which, if desired, may be drilled entirely through the board or member constituting the side and then closed at the lower end of the bottom 3. In each of these sockets 2 is situated a coil-spring 4, which is securely held at its lower end by tack or pin 5, passing transversely through the sockets 2 and also through a hook or eye 6, formed on the lower extremity of the spring. The upper extremity of the spring is vertically elongated and then twisted back or downwardly upon itself, as shown at 7, to form a hook 8, which engages over a cranked portion 9 of each of the arms 10 of the bail, so that when the bail is down in the position shown in Figs. 1 and 2 the tendency of the spring will be to keep it down; but when it is up in the position shown in Fig. 3 the tendency of the spring will be to hold it up. Each of the cranks 9 has a journal 11, and these journals of the two cranks are turned in opposite directions or away from each other and mounted in suitable bearings or bushings 12, each secured in a horizontal socket 13, formed in the side of the drawer adjacent to the vertical sockets 2, and the upper edge of this side part of the drawer at the end of the sockets 2 and over as far as the bushing 12 is cut or recessed on an incline, as shown at 14, to allow for the operation of the bail and to accommodate the crank 9.

When the bail is turned upwardly, as shown in Fig. 3, the arm 9ª of the crank will be long enough to bring the crank 9 above the top of the drawer, and therefore it will be seen that in assembling the parts the bail will be held in the position shown in Fig. 3 and the journals 11 introduced into their bushings in the sockets 13, the recess 14 being just wide enough for the accommodation and movement of the horizontal portion 9 of the crank, so that after the journal 11 is introduced it cannot slip out again until the bail is turned in its vertical position, and the spring tendency of the bail to retain it in the socket is overcome, and it cannot be withdrawn even then after the hook 8 is placed over the crank owing to the fact that the spring substantially fills the sockets 2 and the hook engages the arm 9ª, and thereby prevents longitudinal movement of the journal 11.

The upper extremity of the spring, or more accurately speaking the terminal of the wire of which the spring is formed, being twisted upon itself it is rendered sufficiently rigid to make the hook 8 durable, and it being considerably extended above the top convolution of the spring it is adapted to oscillate back and forth with the crank 9 without bending or pressing against the wood with undue force, that might split the side of the drawer. On the whole, therefore, the device is very simple and durable and is not expensive to manufacture.

Having thus described my invention, what I claim as new therein, and desire to secure by Letters Patent, is—

1. In a letter-file, the combination of a box or drawer having vertical sockets formed through the upper edge of its side, and recesses at the upper ends of said sockets, a bail having its ends provided with cranks, said cranks standing normally entirely within the recesses, with their extremities journaled in one wall thereof and being substantially as wide as the recesses, and coil-springs removably secured by one end within the sockets, the free ends thereof removably engaging the cranks within the recessed portion.

2. In a letter-file, the combination of a box or drawer having vertical sockets formed through the upper edge of its side and recesses at the upper ends of said sockets, a bail having its ends provided with cranks, the extremity of the bail being journaled in one of the walls of the recesses, and prevented from displacement by the other wall of the recess when the cranks are in their normal position, and coil-springs within the sockets removably engaging the cranks, said cranks being adapted to be turned about their journals and out of the recesses, whereby the same may be detached.

CURTIS McPIKE.

Witnesses:
J. D. CONNER, Jr.,
G. BANISTER.